2,733,240
Patented Jan. 31, 1956

2,733,240

PROCESS FOR PREPARATION OF ALLOPREG-
NANE-3β,17α-DIOL-11,20-DIONE AND ESTERS
THEREOF AND INTERMEDIATES THEREFOR

George Rosenkranz and John Pataki, Mexico City,
Mexico, and Carl Djerassi, Detroit, Mich., assignors to
American Syntex Incorporated, Mexico City, Mexico,
a corporation of Mexico No Drawing. Application February 27, 1953,
Serial No. 339,448

Claims priority, application Mexico February 29, 1952

12 Claims. (Cl. 260—239.55)

The present invention relates to a novel process for the production of cyclopentanophenanthrene derivatives and to certain novel cyclopentanophenanthrene intermediates.

More particularly, the present invention relates to a novel process for the production of allopregnan-3β,17α-diol-11,20-dione which is an important intermediate for the production of cortisone. The present invention also relates to certain 16-bromo compounds and 16α,17α-oxido compounds which are intermediates for the production of the novel 3-monoacetate allopregnan-3β,17α-diol-11,20-dione.

In our United States patent application, Serial Number 288,311, filed May 16, 1952, there is disclosed a process for the production of allopregnan-3β,17α-diol-11,20-dione as well as a method for the conversion of this compound to the cortical hormone cortisone.

In accordance with the present invention, we have discovered a novel method for the production of allopregnan-3β,17α-diol-11,20-dione and especially the novel esters thereof from the corresponding ester of Δ16-alloprenen-3β-ol-11,20-dione. We have further discovered that esters of Δ16-allopregnen-3β-ol-11,20-dione may be converted into the novel 16α,17α-oxido allopregnan-3β-11,20-dione or its esters and these last compounds may be converted into the novel corresponding 16β-bromo compounds.

The following equation illustrates the present invention:

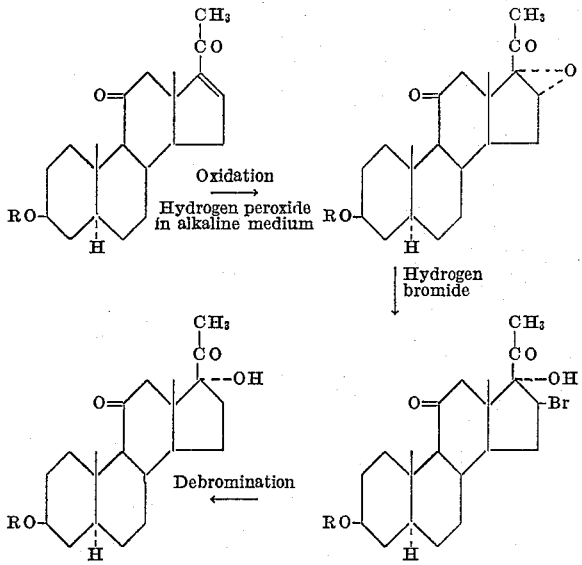

In the above equation, R represents an acyl group, i. e., the residue of any organic acid conventionally utilized for the esterication of steroid alcohols. Preferably, R represents the residue of a lower fatty acid such as acetic or propionic or the residue of an aromatic acid such as benzoic. R also represents hydrogen when the free compounds are utilized rather than their esters.

In practicing the process above outlined, Δ16-allopregnen-3β-ol-11,20-dione or an ester thereof such as the acetate is dissolved in an organic polar solvent such as methanol and treated with hydrogen peroxide in an alkaline medium as for example, a dilute aqueous solution of an alkali metal hydroxide. The reaction mixture was then maintained under refrigerated conditions, i. e., a temperature of about 10° C., for approximately 12 hours. Suitable separation and purification gave the corresponding 16α,17α-oxido-allopregnan-3β-ol-11,20-dione compound.

The epoxide thus formed was then dissolved in acetic acid and treated with hydrogen bromide in acetic acid for a short period of time at a temperature just below room temperature to prepare the corresponding bromohydrin as for example, 16-bromo-allopregnan-3β,17α-diol-11,20-dione or its esters. Treatment of this type of compound with a debrominating agent such as Raney nickel or hydrogen in the presence of a palladium on calcium carbonate catalyst produced the corresponding allopregnan-3β,17α-diol-11,20-dione or its esters. The esters could be conventionally saponified to produce the free compound.

The following specific examples serve to illustrate but are not intended to limit the present invention:

*Example 1*

A solution of 5 g. of 22-isoallospirostan-3β-ol-11-one prepared in accordance with United States application, Serial Number 306,511, in 20 cc. of acetic anhydride was heated in a sealed tube at 196° C., during 8 hours. The solution was poured in water and extracted with ether, washed with sodium bicarbonate and water until neutral, dried over sodium sulphate and evaporated to dryness. 4.45 g. of Δ20(22)-allofurostene-3β,26-diol-11-one diacetate were obtained in the form of a yellow oil. Without further purification, the oil was dissolved in the hot in a mixture of 45 cc. of acetic acid, 36 cc. of ethylene dichloride and 15 cc. of water. The solution was cooled to 15° C., and then treated drop by drop and under mechanical stirring with a solution of 1.35 g. of chromic anhydride in 2.1 cc. of water and 21 cc. of acetic acid. After two hours standing at room temperature, the solution was poured in water and the layer of ethylene dichloride was separated. The aqueous layer was extracted with chloroform and the combined chloroform and ethylene dichloride solutions were washed several times with water, dried over sodium sulphate and evaporated to dryness. The residue was dissolved in a mixture of 50 cc. of benzene and 200 cc. of hexane and chromatographed in a column with 250 g. of alumina. The fractions eluted with benzene-ether (30:20 and 40:10) were combined and evaporated to dryness. On digesting with a mixture of ether-pentane, the residue yielded 1.7 g. of crystalline Δ16-allopregnene-3β-ol-11,20-dione acetate with a melting point of 184°–185.5° C.

A solution of 2.47 g. of Δ16-allopregnen-3β-ol-11,20-dione acetate in 300 cc. of methanol was cooled to a temperature of 10°. Then a 30% aqueous solution of hydrogen peroxide and 20 cc. of a 5% solution of sodium hydroxide were added simultaneously dropwise from two separatory funnels and the mixture was kept overnight in the refrigerator. It was then poured into water and the precipitate was collected, washed and air dried. Recrystallization from methanol followed by acetylation with acetic anhydride in pyridine solution afforded a nearly quantitative yield of 16α,17α-oxido-allopregnan-3β-ol-11,20-dione acetate with a melting point of 236°–238° C., [α]$_D$ +76° (chloroform).

Example II 1.5 g. of the epoxide obtained according to Example I dissolved in 60 cc. of acetic acid was cooled to 12° C. and treated with 2.3 cc. of a 32% solution of hydrogen bromide in acetic acid. After 30 minutes standing at 18° the mixture was poured into water and the precipitate of the bromohydrin was filtered, washed and air dried. This bromohydrin 16-bromo-allopregnan-3β,17α-diol-11,20-dione 3-monoacetate was dissolved in 75 cc. of alcohol and refluxed for 5 hours with 20 g. of Raney nickel. The solution was filtered while hot and evaporated at a moderate temperature under reduced pressure. The residue crystallized from methanol giving allopregnan-3β,17α-diol-11,20-dione 3-monoacetate with a melting point of 167°–170° C., $[\alpha]_D +9°$ (chloroform).

A sample of this acetate was saponified by refluxing during 1 hour with 1% methanolic sodium hydroxide. After pouring into water the product was extracted with ethyl acetate, washed, dried over sodium sulphate and evaporated to dryness. Crystallization of the residue from methanol afforded colorless crystals of allopregnan-3β,17α-diol-11,20-dione, with a melting point of 273°–274° C., identical in all respects to the one obtained according to our previously mentioned patent application Serial No. 288,311.

Example III 2 g. of the bromohydrin obtained as intermediate product according to Example II were dissolved in 150 cc. of ethanol and hydrogenated at room temperature and atmospheric pressure under an atmosphere of hydrogen in the presence of 7 g. of 2% palladium on calcium carbonate catalyst which was prepared according to the method of Busch and Stöve, Ber., 49, 1063 (1916). After approximately 1 hour, the equivalent of 1 mol of hydrogen had been absorbed; the solution was filtered from the catalyst and evaporated to dryness. Recrystallization from methanol yielded allopregnan-3β,17α-diol-11,20-dione acetate identical to the one obtained according to the previous example.

We claim:

1. A process for the production of a compound selected from the class consisting of allopregnan-3β,17α-diol-11,20-dione lower fatty acid esters and benzoic acid esters thereof which comprises treating a compound selected from the class consisting of Δ¹⁶-allopregnen-3β-ol-11,20-dione lower fatty acid esters and benzoic acid esters thereof with hydrogen peroxide in alkaline medium to form the corresponding 16α,17α-oxido compound, reacting the oxido compound with hydrogen bromide to form the corresponding 16β-bromo-17α-hydroxy compound and treating the 16-bromo-17α-hydroxy compound with a debrominating agent.

2. The process of claim 1 wherein the debrominating agent is Raney nickel.

3. The process of claim 1 wherein the debrominating agent is hydrogen in the presence of a palladium on calcium carbonate catalyst.

4. A process for the production of 16α,17α-oxido-allopregnan-3β-ol-11,20-dione acetate which comprises treating Δ¹⁶-allopregnen-3β-ol-11,20-dione acetate with hydrogen peroxide in an alkaline medium.

5. A process for the production of 16α-bromo-allopregnan-3β,17α-diol-11,20-dione 3-acetate which comprises treating 16α,17α-oxido-allopregnan-3β-ol-11,20-dione acetate with hydrogen bromide.

6. A process for the production of allopregnan-3β,17α-diol-11,20-dione 3-acetate which comprises treating 16β-bromo-allopregnan-3β,17α-diol-11,20-dione 3-acetate with a debrominating agent.

7. The process of claim 6 wherein the debrominating agent is Raney nickel.

8. The process of claim 6 wherein the debrominating agent is hydrogen in the presence of a palladium on calcium carbonate catalyst.

9. A new compound selected from the class consisting of 16α,17α-oxido-allopregnan-3β-ol-11,20-dione lower fatty acid esters and benzoic acid esters thereof.

10. 16α,17α-oxido-allopregnan-3β-ol-11,20-dione 3-acetate.

11. A new compound selected from the class consisting of 16-bromo-allopregnan-3β,17α-diol-11,20-dione 3-lower fatty acid esters and 3-benzoic acid esters thereof.

12. 16-bromo-allopregnan-3β,17α-diol-11,20-dione 3-acetate.

References Cited in the file of this patent

Sarett: Jour. Am. Chem. Soc., 70, 1454–1458 (1948).
Fried: Jour. Am. Chem. Soc., 71, 3260–1 (1949).
Chamberlin et al.: Jour. Am. Chem. Soc., 73, 4052–3 (1951).